June 19, 1951 — F. M. ASPIN — 2,557,777
ROTARY VALVE CONSTRUCTION
Original Filed May 19, 1944
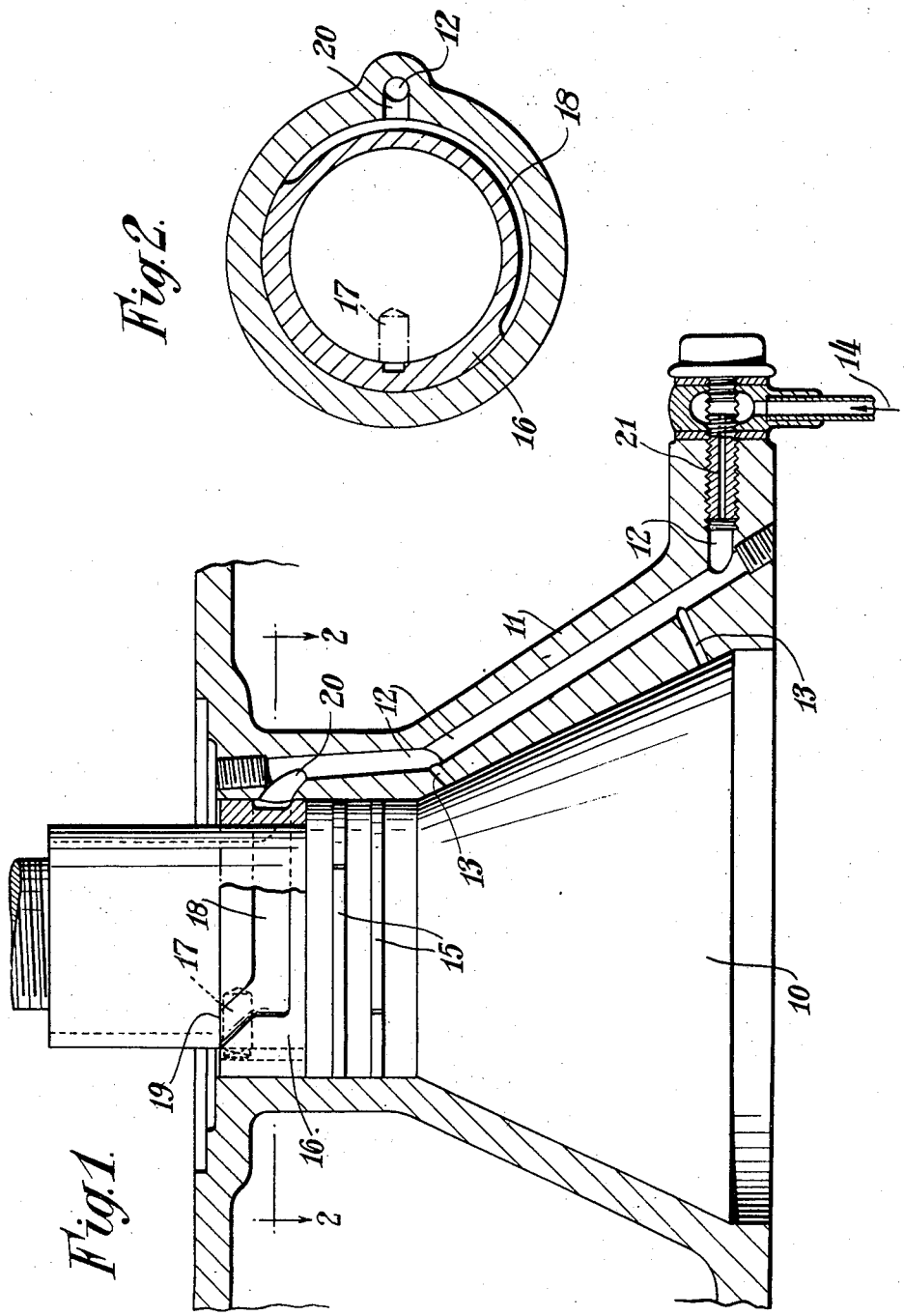
INVENTOR:
Frank M. Aspin
Attorney: Walter Gunn Patented June 19, 1951

2,557,777

UNITED STATES PATENT OFFICE 2,557,777

ROTARY VALVE CONSTRUCTION

Frank Metcalf Aspin, Bury, England

Original application May 19, 1944, Serial No. 536,329, now Patent No. 2,526,450, dated October 17, 1950. Divided and this application August 4, 1945, Serial No. 608,883. In Great Britain May 12, 1943

Section 1, Public Law 690, August 8, 1946
Patent expires May 12, 1963

11 Claims. (Cl. 251—93)

This invention relates to the lubrication systems of internal combustion engines, compressors and the like and is particularly, but not exclusively, applicable to internal combustion engines, compressors or the like having rotary valves of the kind described in my prior Patents Nos. 2,283,594; 2,245,743 and 2,296,081 and pending applications for patents Serial Number 491,010, which has matured into Patent 2,403,165 dated July 2, 1946; Serial Number 487,614 which has matured into Patent 2,387,972 dated October 31, 1945; Serial Number 487,613 which has matured into Patent 2,378,120 dated June 12, 1945; Serial Number 502,449 which has become abandoned, and others. The present application is a division of my co-pending application Serial No. 536,329, filed May 19, 1944, for "Lubrication System," now Patent 2,526,450, granted October 17, 1950.

Rotary valves of the kind above referred to are by no means uneconomic or wasteful of lubricant, but at the same time there is room for improvement as regards their lubrication. The bearing loads on the complementary gas-sealing and bearing surfaces of such valves vary very considerably from a peak load, at the peak pressure of combustion, down possibly to a negative load during the "induction" phase. Also, where the valve is that of an internal combustion engine subject to throttle control, there are other controlling factors of variation of load and speed. Obviously an ideal lubrication system would be one in which the lubrication varies with all these changes. It is known to some degree for the general lubrication of an engine, compressor, or the like, to be proportional to engine speed, as the normal lubrication, obtained by pumps driven by the engine, must necessarily produce a pressure which is to some extent proportional to the engine speed; but this relation is usually very limited by providing excess pump delivery and using a pressure-release valve, so that an almost constant pressure obtains in the lubrication system and provides full lubrication for heavy loads at slow speeds. Although not in general use, it has also been proposed in an internal combustion engine to provide control of the pressure-release valve, proportionally with the engine throttle so that the pressure in the lubrication system may increase as some function of the engine load. None of these previously known arrangements, however, has provided for variation of pressure or supply of the system relative to the pressure fluctuations of the engine cycle.

As regards rotary valves, and particularly those of the kind described in my earlier patent specifications aforesaid, the bearing load fluctuates very substantially throughout the engine cycle and in order not to invite undue waste of lubricant whilst ensuring ample lubrication during peak load, it is obviously desirable to provide some system of lubrication which has a corresponding cycle or phase so that it is effective during the load phase and relatively reduced but still effective during the exhaust and/or induction phase when the loads are reduced and when lubrication can be reduced to cut down loss at the ports.

The object of the present invention is to provide an improved system of lubrication having such desired characteristics and is based upon the appreciation that such desired result cannot be obtained merely by introducing a rotary cut-off feature into the lubricant supply passage, because at the higher engine speeds the inertia of the lubricant would reduce the flow of lubricant and thus operate to reduce lubrication at the time when due to such increased speed it really needs to be increased.

In the accompanying drawings:

Fig. 1 is a sectional elevation of part of a rotary valve for an internal combustion engine embodying one example of lubrication system according to the invention.

Fig. 2 is a sectional plan on line 2—2 of Fig. 1.

As shown in Figs. 1 and 2 of the drawings, a rotary valve member 10 is mounted in a housing 11. Lubrication for the conical complementary bearing surfaces is provided by an oil duct 12 in the housing with passages 13 therefrom leading to such bearing surfaces. Lubricant is supplied to the duct 12 under pressure in the direction of the arrow 14, as for example from the normal forced-lubrication system of the engine.

The rotary valve member has sealing rings 15 on its stem which serve both as a gas seal and to prevent escape of lubricant from the complementary tapered bearing surfaces. Above the sealing rings and on the stem of the valve member is located a lubrication control ring 16, which is keyed to the rotary valve member by a driving pin 17. This control ring 16 is formed with a groove 18 having an outlet 19 at one side. The groove 18 is adapted to register with an outlet 20 from the duct 12 so that, as the valve member rotates, the outer periphery of the ring alternately and synchronously with the engine cycle closes the outlet 20 or allows lubricant to flow from such outlet 20 through the groove 18 and outlet 19. A jet 21 is shown in the duct 12 the function of which jet is to limit the flow of oil to the duct 12 so that when the outlet 20 is in register with the groove 18, the pressure release afforded by the outlets 19 of the groove will be substantial. This provision is obviously necessary for a multi-cylinder engine in order to maintain the required pressure in the lubrication system. On the other hand, the passage in the jet is of sufficient size to ensure rapid building up of pressure in the duct 12 when the outlet 20 is closed.

In operation, the ring 16 is timed relative to the engine cycle so that its groove unmasks the outlet 20 during that part of the engine cycle when bearing pressures at the tapered valve surfaces are at a minimum. During the compression and explosion cycle of the engine the ring 16 closes the outlet 20 and pressure builds up in the duct 12 so that lubricant is supplied to the feed ducts 13 at increased pressure. As will be seen, when the engine speed is low the groove 16 provides a substantial release of pressure. As the speed of rotation increases the pressure release provided by the groove 16 becomes less effective because the inertia of the lubricant becomes a controlling factor and at high speeds the outlet 20 is closed again by the ring almost before the lubricant has started to flow. Consequently at higher speeds a higher lubrication pressure is maintained.

The invention may be combined in an internal combustion engine with means to vary the supply pressure of lubricant to the duct 12 by any suitable means, such as a release valve loaded proportionally with the throttle opening so that the lubrication pressure at the tapered bearing surfaces will be proportional to engine loads as well as to engine speed whilst having a cyclic variation synchronous with the cyclic variation of load at the said bearing surfaces. Such means form the subject of my application of U. S. patent, Serial No. 536,329.

The invention is obviously not limited to all the details of construction of the example above described, many of which are clearly capable of modification without departing from the nature of the invention.

What I claim is:

1. A rotary valve structure for engines comprising a rotary valve, a housing having a thrust seat for said valve, a duct having at least one passage in said housing to said valve, an inlet for lubricant under pressure in continuous communication with said passage, an additional exit for said duct, an annular extension on said valve adapted to contact with said exit to close the same, an outlet duct for said extension and means on said extension for establishing communication from said exit to said outlet duct at predetermined portions of the rotation of said valve.

2. A rotary valve structure for engines comprising a conical rotary valve, a conical housing having a thrust seat for said valve, a duct having at least one passage in said housing to said valve, an inlet for lubricant under pressure in continuous communication with said passage, an additional exit for said duct, an annular extension on said valve adapted to contact with said exit to close the same, an outlet duct for said extension and means on said extension for establishing communication from said exit to said outlet duct at predetermined portions of the rotation of said valve.

3. A rotary valve structure for engines comprising a rotary valve, a housing having a thrust seat for said valve, a duct having at least one passage in said housing to said valve, an inlet for lubricant under pressure in continuous communication with said passage, an additional exit for said duct, an annular extension on said valve adapted to contact with said exit to close the same, an outlet duct for said extension and a passageway on the face of said extension and having an outlet for establishing communication from said exit to said outlet duct at predetermined portions of the rotation of said valve.

4. A rotary valve structure for engines comprising a rotary valve, a housing having a thrust seat for said valve, a duct having at least one passage in said housing to said valve, an inlet for lubricant under pressure in continuous communication with said passage, an additional exit for said duct, an annular extension on said valve adapted to contact with said exit to close the same, an outlet duct for said extension and a passageway on the face of said extension extending a substantial distance around the circumference of said extension and having an outlet for establishing communication from said exit to said outlet duct at predetermined portions of the rotation of said valve.

5. A rotary valve structure for engines comprising a conical rotary valve, a conical housing having a thrust seat for said valve and having a cylindrical portion, a duct having at least one passage in said housing to said valve, an inlet for lubricant under pressure in continuous communication with said passage, an additional exit for said duct, a corresponding cylindrical portion on said valve and fitted with sealing rings, a driving connection thereon, an annular extension surrounding said connection and adapted to contact with said housing, an outlet duct for said extension and means on said extension for establishing communication from said exit to said outlet duct at predetermined portions of the rotation of said valve.

6. A rotary valve structure for engines comprising a conical rotary valve, a conical housing having a thrust seat for said valve and having a cylindrical portion, a duct having at least one passage in said housing to said valve, an inlet for lubricant under pressure in continuous communication with said passage, an additional exit for said duct, a corresponding cylindrical portion on said valve and fitted with sealing rings, a driving connection thereon, an annular extension surrounding said connection and adapted to contact with said housing, an outlet duct for said extension, said extension being locked on said connection, and means on said extension for establishing communication from said exit to said outlet duct at predetermined portions of the rotation of said valve.

7. A rotary valve structure for engines comprising a conical rotary valve, a conical housing having a thrust seat for said valve and having a cylindrical portion, a duct having at least one passage in said housing to said valve, an inlet for lubricant under pressure in continuous communication with said passage, an additional exit for said duct, a corresponding cylindrical portion on said valve and fitted with sealing rings, a driving connection thereon, an annular extension surrounding said connection and adapted to contact with said housing, an outlet duct for said extension and a passageway on the face of said extension and having an outlet for establishing communication from said exit to said outlet duct at predetermined portions of the rotation of said valve.

8. A rotary valve structure for engines comprising a conical rotary valve, a conical housing having a thrust seat for said valve and having a cylindrical portion, a duct having at least one passage in said housing to said valve, an inlet for lubricant under pressure in continuous communication with said passage, an additional exit for said duct, a corresponding cylindrical portion on said valve and fitted with sealing rings, a driving connection thereon, an annular extension surrounding said connection and adapted to contact with said housing, an outlet duct for said extension and a passageway on the face of said extension, extending a substantial distance around the circumference of said extension, and having an outlet for establishing communication from said exit to said outlet duct at predetermined portions of the rotation of said valve.

9. A rotary valve structure for engines comprising a conical rotary valve having a cylindrical portion in the small end thereof, a housing for said valve having corresponding conical and cylindrical portions contacting therewith, a duct for lubricant in said conical housing and said cylindrical housing, passageways from said duct to the interior of said conical housing, an exit opening from said duct to the interior of said cylindrical housing, a groove in said cylindrical portion of said valve adapted to communicate at intervals during the rotation of said valve with said exit, and an outlet from said groove.

10. A rotary valve structure for engines comprising a conical rotary valve, a housing for said valve, a duct for lubricant in said housing, an inlet for lubricant to said duct, an exit opening from said duct to the interior of said housing, a groove in said valve adjacent to said exit opening, said groove being adapted to communicate at intervals during the rotation of said valve with said exit, an outlet from said groove, and passageways in said duct intermediate said inlet and exit to the interior of said housing to lubricate said valve.

11. A rotary valve structure for engines comprising a conical rotary valve having a cylindrical portion in the small end thereof, a housing for said valve having corresponding conical and cylindrical portions contacting therewith, a duct for lubricant in said housing, an inlet for lubricant to said duct, an exit opening from said duct to the interior of the cylindrical portion of said housing, a groove in said valve adjacent to said exit opening, said groove being adapted to communicate at intervals during the rotation of said valve with said exit, an outlet from said groove and passageways in said duct intermediate said inlet and exit to the interior of the conical portion of said housing to lubricate said valve.

FRANK METCALF ASPIN.

REFERENCES CITED

The following references are of record in the file of this patent:

UNITED STATES PATENTS

| Number | Name | Date |
|---|---|---|
| 1,834,285 | Loeffler | Dec. 1, 1931 |
| 1,875,623 | Longbotham | Sept. 6, 1932 |
| 2,296,081 | Aspin | Sept. 15, 1942 |
| 2,305,874 | Isley | Dec. 22, 1942 |
| 2,374,191 | Gernandt | Apr. 24, 1945 |
| 2,385,089 | Lerner | Sept. 18, 1945 |